United States Patent [19]

Gifford et al.

[11] 4,371,124
[45] Feb. 1, 1983

[54] DRAG SYSTEM FOR SPINNING STYLE FISHING REEL

[75] Inventors: Richard L. Gifford, Tulsa; Richard R. Councilman, Collinsville, both of Okla.

[73] Assignee: Brunswick Corporation, Skokie, Ill.

[21] Appl. No.: 85,925

[22] Filed: Oct. 18, 1979

[51] Int. Cl.³ .................... A01K 89/01; A01K 89/02
[52] U.S. Cl. .............................................. 242/84.51 A
[58] Field of Search ................. 242/84.21 R, 84.21 A, 242/84.2 G, 84.2 R, 84.51 A, 84.5 A

[56] References Cited

U.S. PATENT DOCUMENTS

| | | | |
|---|---|---|---|
| 2,711,292 | 6/1955 | Taggart et al. | 242/84.21 A |
| 2,863,617 | 12/1958 | Chapin et al. | 242/84.21 R |
| 3,222,009 | 12/1965 | Sarah | 242/84.5 A |
| 3,948,465 | 4/1976 | Scusa | 242/84.5 R |
| 4,196,868 | 4/1980 | Puryear | 242/84.21 R |

FOREIGN PATENT DOCUMENTS 179039  4/1962  Sweden .................. 242/84.21 R

*Primary Examiner*—Billy S. Taylor
*Attorney, Agent, or Firm*—John G. Heimovics

[57] ABSTRACT

This invention comprehends a small drag assembly that is conveniently mounted in the rear part of the housing of the spinning style fishing reel. The drag assembly includes a knob mounted at the rear of the housing. A pocket is provided in the housing to accommodate the small and simple drag system.

1 Claim, 6 Drawing Figures

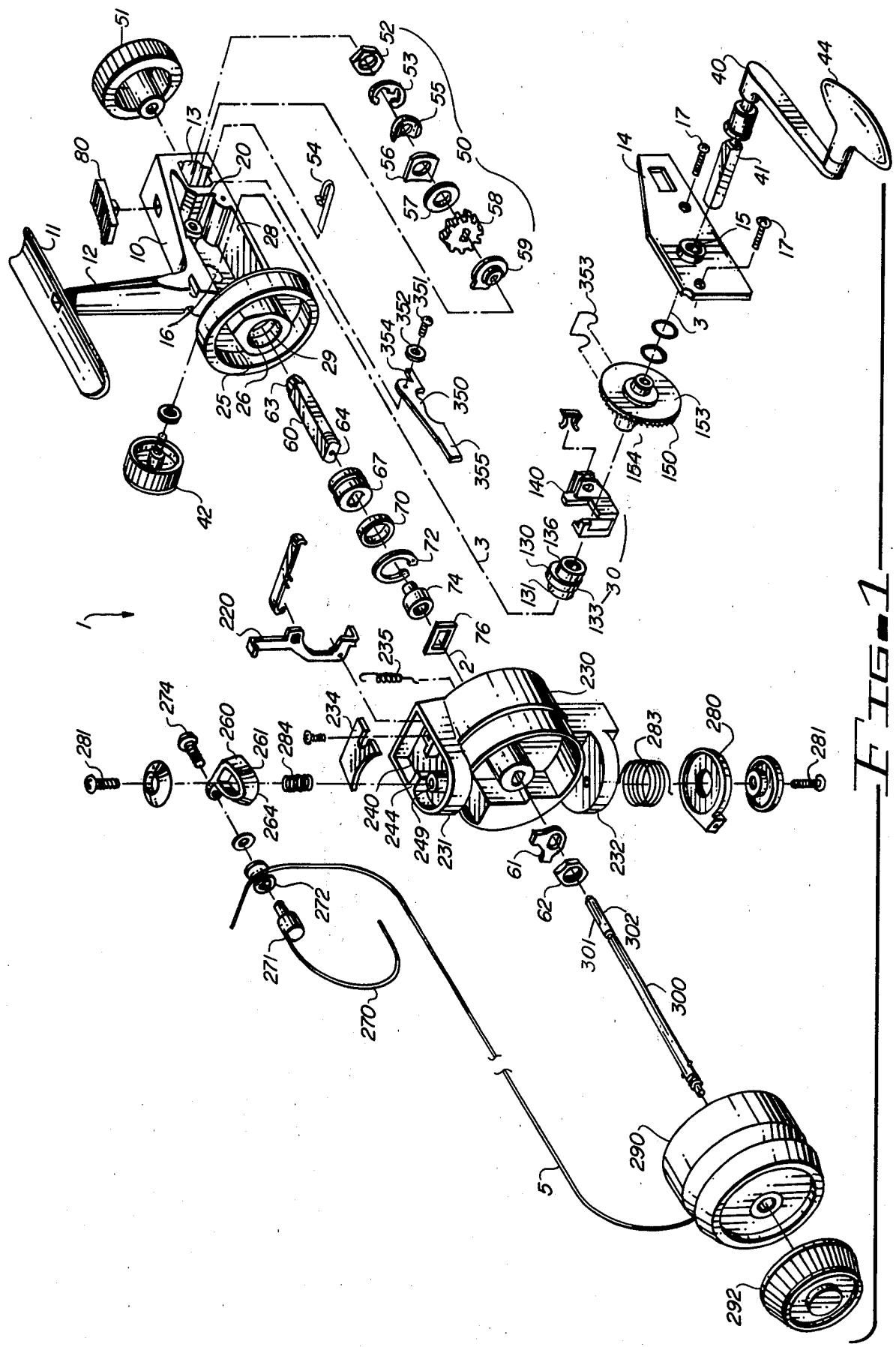

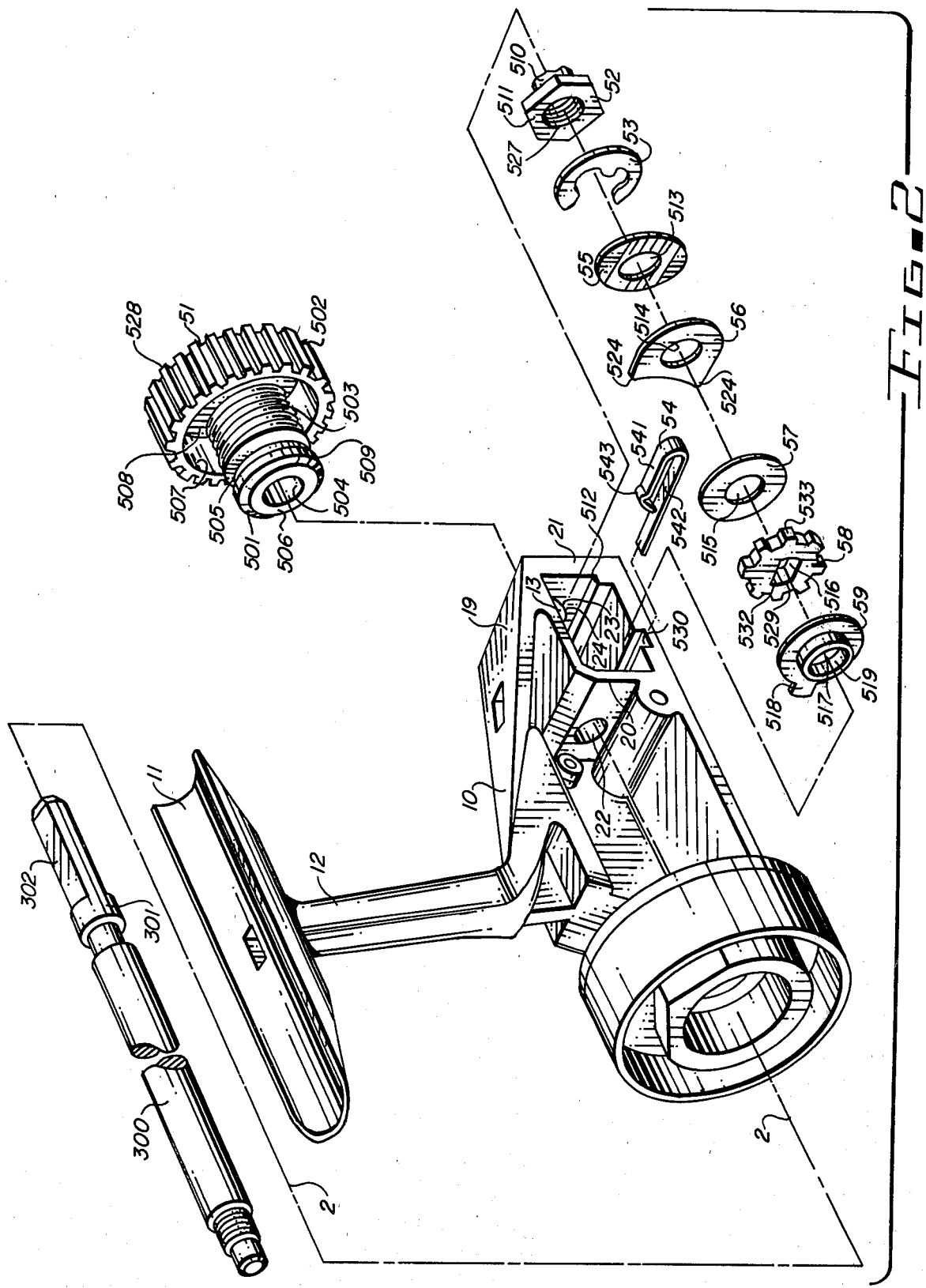

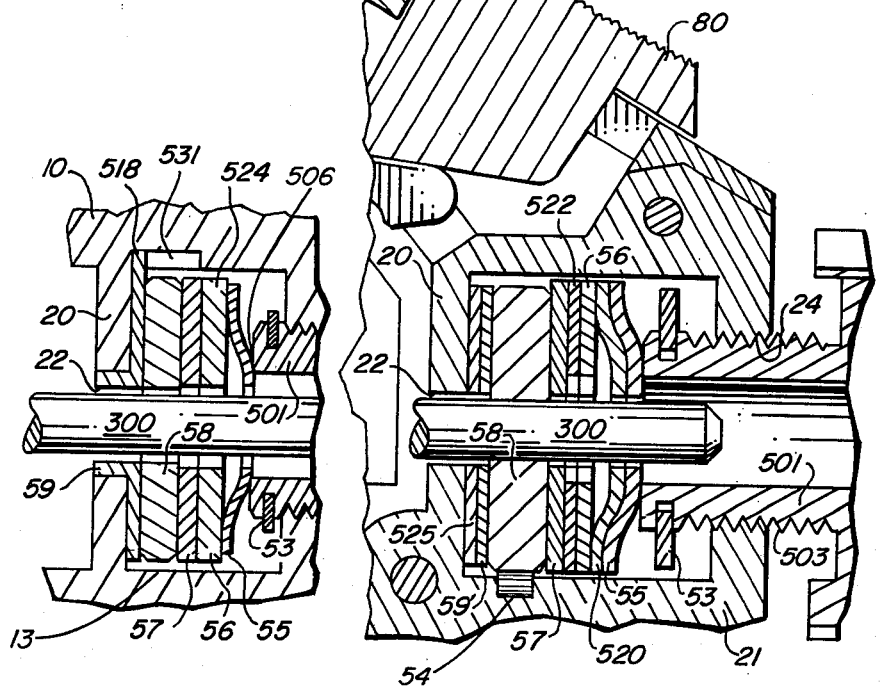
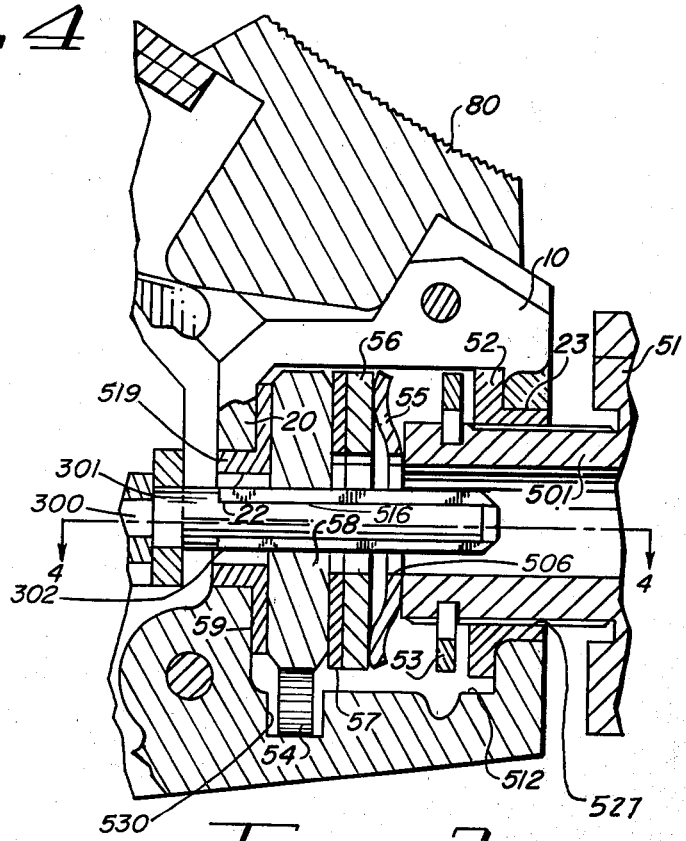

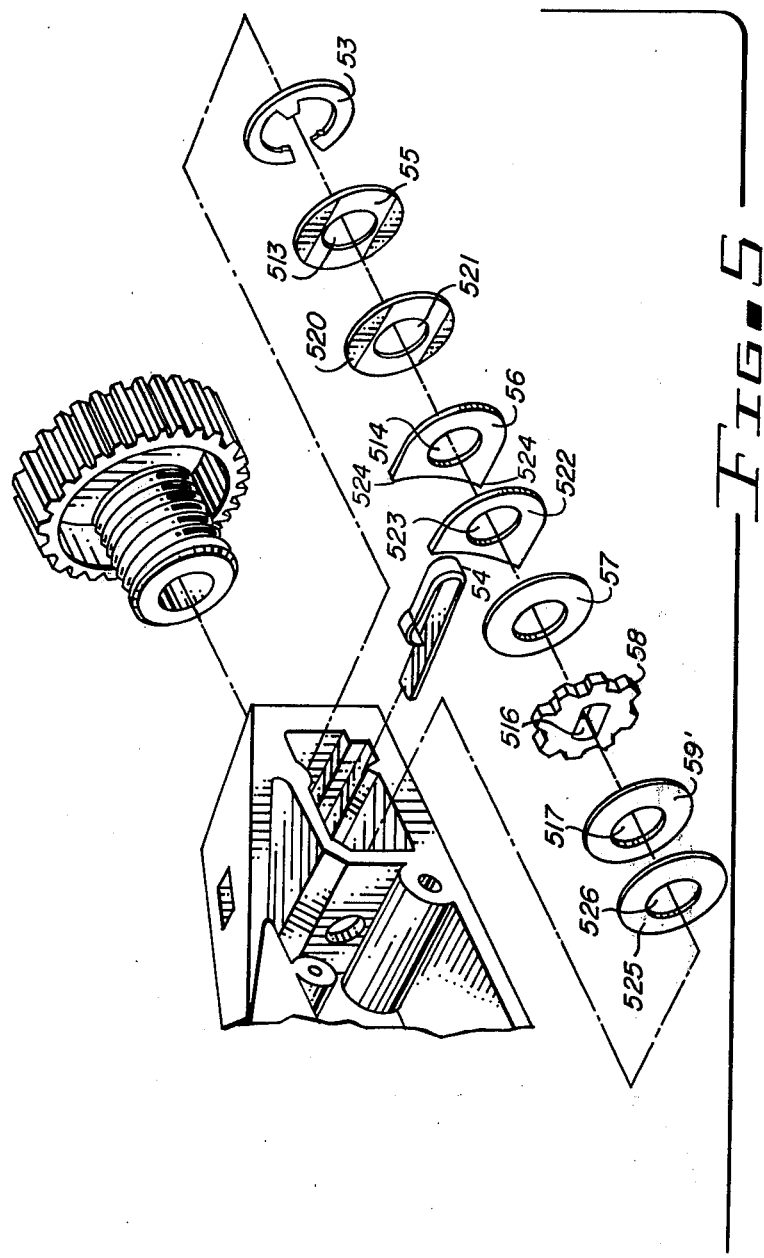

DRAG SYSTEM FOR SPINNING STYLE FISHING REEL

BACKGROUND OF THE INVENTION

1. Field of the Invention

This invention relates to spinning style fishing reels, and more particularly, relates to a small drag assembly machanism that is located in a pocket in the reel housing which is positioned next to the gear case of the reel housing.

2. Background of the Prior Art

In most spinning type fishing reels a drag assembly that permits limited rotation of the spool, when a tension force is applied to the fishing line, is located within the spool mechanism, such as taught in U.S. Pat. No. 2,739,767. There have been a few patents, such as U.S. Pat. No. 2,863,617 to Chapin et al, that depict a drag mechanism located at the rear of the reel housing. However, the Chapin et al. device does not provide easy access to the drag mechanism, an easily assembled mechanism or a smoothly operated mechanism. Subsequent to Chapin et al., the ZEBCO Fishing Tackle Division introduced into the market place its "CARDINAL" line of spinning reels with the drag assembly mounted at the rear and toward the bottom of the housing. Removal of the side cover plate gave access to the drag assembly, but because of an L-shaped pressure bar, it was very difficult to remove and then replace the drag assembly.

In a later development, a free floating drag assembly is taught in U.S. patent application Ser. No. 932,845, filed Aug. 11, 1978 by J. W. Puryear and incorporated in the ZEBCO OMEGA 840 and 940 spinning reels. This drag assembly is located at the rear of the fishing reel housing, accessible by removal of the side cover plate with the drag mechanism essentially self-contained in a free floating drag cup. This free floating drag assembly works well with larger size reels, but requires too much space and too many parts for a small lightweight spinning reel.

SUMMARY OF THE INVENTION

This invention relates to spinning style fishing reels and comprehends a small drag assembly that is mounted in the reel housing and controlled at the back of the fishing reel by simply rotating a knob clockwise or counterclockwise. Flat circumferential frictional interfaces are provided which drastically reduce the size of the drag assembly so that it may be utilized in very small spinning style fishing reels.

It is therefore an object of this invention to provide a small drag assembly for a fishing reel that fits neatly into the back portion of the housing of the fishing reel.

It is an object of such an invention to provide a pocket that is die cast as part of the fishing reel housing that can accommodate such a drag assembly.

It is still another object of this invention to provide a small six-piece drag assembly that is coaxially mounted on the spool shaft of the fishing reel.

It is yet another object of this invention to provide a means for insuring that a part of the drag assembly does not rotate relative to the reel housing.

It is a feature of this invention to provide a threaded flange nut portion of the assembly so that the reel housing can have walls as thin as possible without a drag mounting screw thread therein.

It is another feature of this invention to provide a means incorporated into the reel housing that provides a clicking sound when the drag mechanism is operating.

It is yet another feature of this invention to provide a simple drag assembly that is maintained within a pocket in the fishing reel housing by having the spool shaft project therethrough.

The above and other and further objects and features will be more readily understood by reference to the following detailed description and accompanying drawings.

DESCRIPTION OF THE DRAWINGS

FIG. 1 is an exploded perspective view of the spinning style fishing reel containing the invention described herein;

FIG. 2 is an exploded perspective view of a part of a spinning style fishing reel containing the invention described herein;

FIG. 3 is a partial cross-sectional view of the fishing reel containing the invention herein;

FIG. 4 is a top cross-sectional view taken along line 4—4 of FIG. 3 showing a portion of the fishing reel containing the invention herein;

FIG. 5 is a partial exploded perspective view of another embodiment of the invention contained herein; and, FIG. 6 is a partial cross-sectional view of the fishing reel containing the embodiment of the fishing reel depicted in FIG. 5.

DESCRIPTION OF BASIC STRUCTURE AND OPERATION OF FISHING REEL

In FIG. 1 an open face style fishing reel 1 is shown in an exploded perspective view. The reel 1 having a housing 10 which includes an integral gear case 28, a stem 22 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish is on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle 41 with the drive shaft 154 externally mounted in the side plate bearing 15 and the bearing collar 131 mounted in bearing 16 that is part of the side of the housing 10 and coaxial with bearing 15. Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever retainer 76 are mounted on the pinion 60. The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag pocket 13 of the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis 2 of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 290 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A feature of this fishing reel is a self-centering bail mechanism that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENTS

In a preferred embodiment of the invention, as shown in FIGS. 1 and 2, a pocket 13 at the back of the housing 10 forms a substantially right parallelpiped with an inwardly directed partition 20 having a first hole 22 coaxial with the central shaft 300 and pinion assembly 60. At the back of the reel housing, is a back wall 21 with a second hole 23 which is substantially coaxial with hole 22. The drag assembly 50 is positioned in the pocket 13 and respectfully adjacent are the concave disc spring 55, the D-shaped washer 56, the first frictional washer 57, the disc drive 58 and the second washer 59 which is adjacent the partition 20. In one embodiment, a knob 51 comprises a shank portion 501 with a proximal end 508 secured to the head 502 and a thrust bearing surface 506 on the distal end 509 that projects into the hole 23. The shank 501 has a threaded section 503 that mates with the thread 24 in hole 23 and a passageway 504 that preferably does not extended out through the head 502.

In an alternative embodiment, the hole 23 has no threaded portion 24 but a flange nut 52 having square hexagonal flat sides 511 and a cylindrical extension 510 with a thread 527 therein is positioned in the hole 23 as shown in FIG. 3. In this embodiment, the housing 10 has a ridge 512 just adjacent the hole 23 that mates with one of the flats 511 of the nut 52 so that it will not rotate relative to the housing 10.

The threaded shank 501 is secured into the threads 24 or 527 until the bearing surface 506 is in contact with the disc spring 55. Until now, the drag assembly 50 parts can easily be removed from the pocket 13; however, when the back end 301 of the shaft 300 is slipped into the drag assembly 50 with the holes 513, 514, 515, 517 and 504, all being larger than the maximum diameter of the shaft 300, the drag assembly 50 is confined within the pocket. Since these holes are larger than the shaft 300 diameter, the shaft 300 can revolve freely.

In order for the drag assembly 15 to function properly, the drag drive or disc drive 58 must be keyed to the back end 301 of the shaft 300 so that when the shaft 300 rotates, the disc drive 58 rotates. And, conversely, when the disc drive 58 is prevented from rotating, the shaft 300 cannot rotate. In one embodiment as shown in FIG. 2, the back end 301 has opposed milled flats 302 forming a double-D shaped cross-section at the end of the shaft 300. The disc drive 58 also has a double-D shaped hole mating with flats 302. Obviously, other types of keying means can be utilized such as only one milled flat at the end 301 and a mating D-shaped hole in the drive 58.

When the bearing surface 506 is just contacting the disc spring 55, there is almost no compressive force pushing the D-shaped washer 56, the first frictional washer 57, the disc drive 58 and the second frictional washer 59 against the partition 20. As the shank 501 of the knob 51 is screwed into the pocket 20, the bearing surface 506 pushes against the disc spring 55 which forces the drag assembly 50 parts of the washers 56, 57 and 59 surrounding the disc drive 58 and the drive 58 against the partition 20. The greater the pressure against the spring 55 by the bearing surface 506, the tighter the disc drive 58 is clamped against the partition 20 thereby limiting its ability to rotate. Concomitantly, the less the disc drive 58 can rotate, the less the shaft 300 can rotate thus effectuating a very accurate control by the drag feature of the reel 1. To prevent rotation of the drag assembly parts within the pocket 13, the D-shaped washer 56 has ears 524 that bear against the side wall of the pocket 13 as shown in FIG. 4. Thus, when the washers 57 and 59 and the disc spring 55 are rotated with the disc drive 58, the D-shaped washer 56 acts as the nonrotational member of the drag assembly 50. In the event that all the parts of the drag assembly 50 mounted in the pocket 20 were able to rotate as the shaft 300 rotated, the drag mechanism 50 could not keep the desired clamping pressure against the disc drive 58 to control its rotation. Consequently, the D-shaped washer 56 is the means for preventing the drag assembly 50 from totally rotating in the pocket.

Since the drag adjusting knob 51 with its fluted surface 528 can be adjusted from the back of the reel, a fisherman's fingers do not get in the way of the fishing line while adjusting the drag during fishing. The sensitivity of the drag assembly relies, in part, on the use of different materials for the respective parts of the drag assembly 50. It has been found that the disc spring 55 can be made of flexible metal spring stock that will not take a permanent set when the spring is flattened out. The D-shaped washer 56 preferably can be made from metal such as cold roll steel, stainless steel, etc. The frictional washer 57 is preferably made from a nonmetal material such as polytetrafluoroethylene fluorocarbon in both castable and sheet form which has good shear strength, good frictional characteristics and very low creep. It has been found desirable that the second friction washer 759 be made from the same material whether it is in the flat rotational form as shown in FIGS. 5 and 6 or in the non-rotational form as shown in FIGS. 2 and 3.

In order to secure the shank 501 within the pocket 20, a circular undercut groove 505 is provided on the shank 501 near the bearing surface 506. A C-shaped retainer clip 53 is positioned in the groove 505 to keep the knob 51 within the pocket 13. When the threaded flange 52 is used instead of the threaded hole 24, the retainer clip 505 confines the nut 52 and the shank 501 together keeping both straddling the back wall 21.

In an alternative embodiment of the invention as shown in FIGS. 5 and 6, the invention comprehends that two springs 55 and 520, two D-shaped washers 56 and 522 and an additional washer 525 can be used for larger fishing reels requiring increased frictional surfaces. The respective holes of these additional parts, 521, 523 and 526 are all larger in size than the maximum diameter of the shaft 300; thus, permitting the shaft 300 to also rotate relative to the second disc spring 520, the second D-shaped washer 522 and the frictional washer 525. In this embodiment, the washer 525 is preferably made of metal thus providing two frictional surfaces for the washer 59' and at the same time preventing the washer 59' from being chewed up by rotation against the partition 20 in the event that the partition 20 has a rough internal surface created when the housing 10 is die cast.

In another embodiment of the invention, the washer 59, as shown in FIGS. 2 and 4, has a radially extending lug 518 and a cylindrical portion 519. As shown in FIG. 3, the projection 519 fits in the hole 22. The lug 518 fits in the undercut slot 531 of the housing 10 thus reventing the washer 59 from rotating. The interface between the washer 59 and the disc drive 58 create a circumferential brake shoe type frictional contact area for the disc drive 58 when axial pressure is applied by the bearing surface 506. Likewise, there is also a circumferential brake shoe type functional contact area that occurs at the interface between the non-rotational D-shaped washer 56 and the frictional washer 57. These two interfacial frictional engagements provide a great deal of frictional contact area for very small parts. For example, in one fishing reel incorporating such a drag assembly, the diameter of the elements of the assembly are each about one-half inch and the total thickness of the elements mounted between the bearing surface 506 and the partition 20 (when the shaft is free to rotate) is less than three-eighths inch and closely approaches one-quarter inch. Thus, it has been found that such a small drag assembly can provide a larger amount of interfacial frictional surface engagement to produce, quite surprisingly, a very smooth and sensitive drag control.

In another embodiment of the invention, a slot 530 is provided in the pocket 13 parallel to the partition 20. A J-shaped elongated element 54 having a short leg 541, a long leg 542 and a free nib end 543 is positioned in the slot 530 and is radially adjacent the serrated surface 533 of the disc drag 58. The element 54 is fashioned such that the nib end 543 is in contact with the serrated surface 533. When the shaft 300 keyed to the disc drive 58 rotates, the element 58 makes a clicking sound as the serrated surface 533 causes the nib end 543 to vibrate. The gear housing 28 and the cover plate 14 reinforce the clicking sound acting as a sounding box. The fisherman is acutely aware when the fishing line is being pulled off the spool over the line roller because of the telltale clicking sound.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

What is claimed is:

1. In a spinning reel having a housing with a front spool end and a back drag end, a housing having an integral substantially right parallelepiped shaped pocket at the drag end with an inwardly positioned partition comprising one side of the parallelepiped having a first hole therein, an opposite surface of the parallelepiped at the back of the housing having a second hole in axial alignment with the first hole, a movable center shaft mounted in the housing in axial alignment with the first and second holes and having a front end extending outwardly from the front spool end of the housing and a back end having a key means extending into the pocket, a drag assembly mounted partially within the pocket comprising:

(a) thread means in operable association with the second hole;

(b) a knob having:
   (1) a head mounted exterior to the housing,
   (2) a shank having a distal end projecting in to the second hole and a proximal end secured to the head, the shank having a threaded portion in mating engagement with the thread means and a coaxial passageway for sliding fit with the back end of the shaft, and
   (3) bearing means at the distal end of the shank facing axially of the shaft, (c) disc spring means mounted in the pocket adjacent the bearing means and having a hole coaxial with the passageway, (d) D-shaped means mounted in the pocket adjacent the spring means and having a hole coaxial with the passageway, the D-shaped means coacting with the pocket to prevent rotation of the D-shaped means while permitting axial movement of the D-shaped means;

(e) first washer means mounted in the pocket adjacent the D-shaped means and having a hole coaxial with the passageway;

(f) drive means mounted in the pocket adjacent the washer means and having a hole mating with the key means on the shaft, the drive means having a serrated exterior surface;

(g) second washer means mounted in the pocket between the drive means and the partition and having a hole coaxial with the passageway;

(h) the back end of the shaft extending into the passageway and rotatable therein, the shaft being freely rotatable when the knob is set to provide minimal urging force between the first washer means, the drive means and the second washer means, and rotation of the shaft being limited when the knob means is advanced into the pocket to place the spring means under compression and to force the spring means, the D-shaped means, the first and second washer means and the drive means tightly against the partition thereby limiting rotation of the drive means and concomitantly the shaft; and (i) a J-shaped spring means seated in an undercut groove in the pocket adjacent the drive means, the J-shaped spring means has a short leg in contact with the serrated exterior surface which vibrates making a clicking sound when the drive means rotates.

* * * * *